United States Patent Office 3,407,216
Patented Oct. 22, 1968

3,407,216
METHOD FOR REDUCING PHTHALIDE CONTENT OF PHTHALIC ANHYDRIDE
Robert Baldwin Egbert, Stamford, Conn., assignor to Chemical Process Corporation, Stamford, Conn., a corporation of Massachusetts
No Drawing. Filed Feb. 7, 1966, Ser. No. 525,344
11 Claims. (Cl. 260—346.7)

ABSTRACT OF THE DISCLOSURE

A method of removing phthalide from crude phthalic anhydride by heating the crude phthalic anhydride with $H_2SO_4$ in the presence of chemically combined $H_2O$ in the form of phthalic acid, the temperature and time conditions being controlled to retain in the system a sufficient amount of water to promote the selective reaction of $H_2SO_4$ with phthalide to form phthalic anhydride, $SO_2$ and $H_2O$ at least until most or all of the phthalide has been so reacted.

---

The present invention relates to a unique method for removing the impurity phthalide from crude phthalic anhydride (referred to hereinafter as PAA) derived from the vapor phase, catalytic oxidation of o-xylene by an oxygen-containing gas. The invention further relates to the preparation of a substantially phthalide-free PAA by the vapor phase, catalytic oxidation of o-xylene with an oxygen-containing gas followed by recovery of the PAA from the product gas and treatment of the crude phthalic anhydride product to remove phthalide and other impurities.

For many years, PAA has been made commercially by the vapor phase, catalytic, fluid bed oxidation and naphthalene. More recently, a commercially attractive method for making PAA is by the vapor phase, catalytic, fluid bed air oxidation of o-xylene at reactor temperatures of from about 550° F. to 750° F., preferably 620–720° F. The catalyst used is a vanadium oxide catalyst fluxed with a compound of $SO_3$ and an alkali metal oxide (preferably potassium oxide) and supported on a highly porous, particulate silica gel support. The use of bromine promoter (about 0.1 to 5% by weight of the o-xylene) such as elemental bromine or HBr is advantageous in the o-xylene oxidation whereas it is ineffective in the naphthalene oxidation. Also, about twice the weight of water is formed compared to naphthalene. Furthermore, in the aforesaid o-xylene oxidation, the ratio of air to o-xylene (7.5/1 to 20/1 and preferably 9/1 to 13/1) is markedly less than the ratio of air necessary in the oxidation of either o-xylene or naphthalene in fixed bed catalyst oxidation processes so that the mol percent of water in the product gas is much greater. In all these processes, the PAA is condensed from the product gases and the recovered crude PAA is subjected to a heat treatment and distillation to purify it.

A problem which has presented itself in the oxidation of o-xylene is the presence of phthalide in the crude PAA. The phthalide forms as an intermediate in the oxidation of o-xylene and may be present in the crude PAA in an amount between about 1/10 to about 2 or 3% or more by weight, depending on reactor operating conditions. Although the phthalide is colorless and odorless, nevertheless the presence thereof in the PAA is highly objectionable for certain commercial uses. It is especially troublesome because the phthalide cannot be removed by the purification techniques, such as distillation and heat treatment, conventionally used in the commercial production of PAA. It may thus result in an off-specification product not acceptable for all commercial uses of the PAA. This problem of phthalide in the crude PAA is unique with the o-xylene oxidation product, since crude PAA made by oxidation of naphthalene does not contain phthalide.

Efforts to oxidize the phthalide to PAA in the liquid phase by air oxidation met with failure. It has been proposed in U.S. Patent No. 3,201,423 to do this in the presence of a bromine promoted heavy metal oxidation catalyst, e.g. manganese bromide and cobalt bromide. The crude PAA, which is treated in that patent, is derived from the high temperature fixed bed oxidation of o-xylene. However, this method has many disadvantages, one of which is that the expensive catalyst contaminates the treated PAA and removal thereof is difficult and costly. Furthermore, the oxidation described is relatively expensive and requires considerably plant outlay.

It has been discovered in accordance with the present invention that phthalide can be effectively removed from crude PAA derived from the vapor phase, air oxidation of o-xylene and containing phthalide, by gradually heating $H_2SO_4$ and the crude PAA, containing chemically combined water, for example, in the form of phthalic acid or combined with the sulfuric acid as a hydrate, from a temperature at which $SO_2$ commences to be evolved, usually between about 180 and 200° C., to a temperature of about 260–270° C. over a period of time sufficient for the sulfuric acid to react with all or most of the phthalide and form PAA, $SO_2$ and water before reaching said temperature of 260–270° C., preferably before reaching 240°–250° C. The oxidation reaction between the phthalide and sulfuric acid is believed to be as follows:

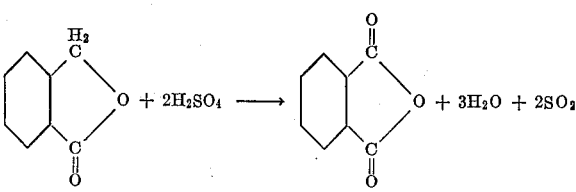

When most, if not all, of the phthalide has been oxidized, there will be a marked decrease in evolution of $SO_2$ so that the temperature of the remaining $H_2SO_4$ and partially treated PAA should be maintained below 260–270° C., preferably below 240–250° C., at least until there is such a marked decrease in $SO_2$ evolution. After that, the temperature is continued to be increased up to the atmospheric boiling point of the PAA (about 285–290° C.), at which temperature it is maintained for a period of time.

The initial amount of $H_2SO_4$ should be at least two mols per mol of phthalide, which is the minimum required to oxidize all the phthalide.

The object of heating so as to control the rate of temperature rise is to ensure that most, if not all, of the phthalide has an opportunity to be oxidized before the vaporization of water from the system has progressed to a point where the ratio of sulfuric acid to water exceeds about 9 or 10 to 1 by weight, preferably not over about 5 or 6 to 1. Preferably, the total initial amount of water present, e.g. in the form of phthalic acid, should be such that the ratio of sulfuric acid to such water is not substantially greater than between about 4 to 1 and 6 to 1. In most cases, with this initial amount of water, the aforesaid object can be achieved where most, if not all, of the phthalide is oxidized before a temperature of about 240–250° C. is reached. However, under some conditions of treatment, for example, higher pressures, the temperature can be raised at a rate at which most, if not all, of the phthalide is oxidized before a temperature of about 260–270° C. is reached.

When water is added to PAA, it forms phthalic acid at a rate dependent on the temperature and concentration and there is an equilibrium between them which is also temperature dependent. Sulfuric acid, by combining with the water, probably affects this equilibrium by extracting combined water from the phthalic acid. It has been observed that when phthalic acid is added to phthalic anhydride at atompheric pressure, boiling with evolution of steam occurs at temperatures of 180° C.–200° C. In other words, the phthalic acid rapidly dehydrates to the anhydride, liberating some of the water in the form of steam. If sulfuric acid is added to the melt before this temperature is reached, no evolution of steam is noted at this temperature level. A temperature of 220° C. is required to bring about the evolution of steam.

As aforesaid, three mols of water are produced per mol of phthalide when the phthalide is oxidized to PAA. Thus, once oxidation begins, water is created, sulfuric acid is consumed, and this tends to dilute the remaining sulfuric acid further. However, steam evolution tends to oppose this tendency and to maintain the acid at its proper concentration for phthalide oxidation.

In view of the failure of air oxidation to oxidize the phthalide, it is indeed surprising that sulfuric acid wll do so qute effectively without addition of a catalyst so long as there is a minimum amount of chemically combined water present in the crude PAA.

For reasons not completely understood, the sulfuric acid is ineffective to remove the phthalide without the presence of water. In fact, without the water, it is believed that the sulfuric acid reacts (perhaps by sulfonation) with the crude mixture to form what appears to be undesirable black sulphones or sulfonates which further contaminate the PAA. These reactions occur without significant evolution of $SO_2$. Thus, without the water, the sulfuric acid treatment can be harmful, rather than beneficial by reducing the yield of PAA product. Also, if the crude PAA is heated rapidly to a temperature of 260–270° C. before most of the phthalide has had a chance to be oxidized, the phthalide is not effectively removed by the sulfuric acid. It is believed that the reason for this is twofold. One reason is that the chemically combined water is driven off as a vapor faster than it is formed by the oxidation reaction so that the amount thereof remaining is reduced below that necessary for the oxidation of phthalide to PAA to proceed. The second reason is that at the higher temperatures, the sulfuric acid preferentially reacts with other impurities to condense and/or oxidize them at the expense of phthalide oxidation. In other words, the other impurities compete with the phthalide in consuming the $H_2SO_4$. In the presence of water, the sulfuric acid appears to react preferentially with the phthalide at temperatures below 260–270° C., particularly below 245–250° C. In fact, in most cases, the bulk of the reaction is completed between 200 and 220° C. at atmospheric pressure.

Sulfuric acid at elevated temperatures has been suggested in U.S. Patent Nos. 2,105,911, 1,817,304 and 2,118,918 to purify crude PAA made by vapor phase oxidation of naphthalene but such crude PAA does not contain phthalide so that the removal of phthalide was not contemplated or accomplished. In such cases, the sulfuric acid is used mainly to convert impurities such as maleic anhydride, maleic acid, aldehydes, quinones, phthaleins and other color bodies and odoriferous compounds, into high molecular weight, non-volatile products which are readily separated from the PAA. This involves entirely different kinds of reactions, which do not require the presence of chemically combined water or controlled temperatures.

Treatment with $H_2SO_4$ of crude PAA derived from oxidation of naphthalene to remove color bodies and odoriferous compounds has also been suggested in U.S. Patents Nos. 2,511,861 and 2,486,808 but phthalide is not a color body or odoriferous. Reference is made in these patents to treatment of crude PAA derived from the vapor phase catalytic oxidation of o-xylene but there is no teaching that chemically combined water must be present or that the temperature if raised too quickly, will vaporize and drive off water so rapidly that the water content drops too low for effective oxidation of the phthalide. Furthermore, there is no teaching of any particular unique impurity problems resulting from the vapor phase catalytic oxidation of o-xylene, it being lumped together with the vapor phase catalytic oxidation of naphthalene in reference to color bodies and odoriferous compounds, even though the impurities in the crude PAA made from these two processes, and hence the problems involved in removing them, are quite different.

In the more recent U.S. Patent No. 3,201,423 directed to catalytic air oxidation of the phthalide to remove it, reference is made to heat treating with sulfuric acid the crude PAA derived from the vapor phase, catalytic fixed bed, high temperature oxidation of o-xylene, before the catalytic air oxidation step. This demonstrates two facts; one, that persons skilled in this art did not recognize, prior to the present invention, that sulfuric acid with heat would remove phthalide, even though it had been suggested to remove other impurities in crude PAA and, two, if there was a sufficient amount of chemically combined water present in the crude PAA of the patent, it had been removed prior to addition of sulfuric acid or else the crude PAA with sulfuric acid added was heated very rapidly to a point where any water present was driven off before the unwanted fraction of the phthalide present was removed. Otherwise, the paatentee would not have had to go to the trouble and cost of subjecting the $H_2SO_4$-treated PAA to the complicated catalyzed air oxidation of phthalide.

Crude PAA, derived from the aforementioned vapor phase, catalytic, fluid bed, air oxidation of o-xylene, followed by condensation of the PAA from the product gas normally contains small amounts of phthalic acid, e.g., 2 to 6% by weight, and such acid thus contains chemically combined water in an amount equal to about 0.2 to 0.6% by weight of the crude PAA. Such phthalic acid appears to be formed as follows: In the product gas in the PAA condensers, a substantial amount, e.g. 8–12 mol percent, of by-product water exists as a vapor in the vapor phase. The PAA condenses as a liquid or solid on the walls of the condensers and water vapor in the product gas upon coming in contact with the condensed liquid or solid PAA chemically combines with some of the PAA to form phthalic acid, most or all of which becomes dissolved and/or suspended in the recovered crude PAA.

The amount of water in the product gas and hence in the crude PAA depends on reactor conditions. The greater the amount of air used, the less the concentration of water in the product gas at constant yield of product. As set forth above, in the aforesaid vapor phase, fluid bed, catalytic air oxidation of o-xylene, there is a substantially higher concentration of water in the product gas and hence in the crude PAA (in the form of phthalic acid) than in the case of naphthalene oxidation or o-xylene oxidation in a fixed bed. In the case of naphthalene oxidation, less water is formed by virtue of the smaller number of hydrogen atoms which must be oxidized to water. In the case of fixed bed o-xylene oxidation, a much higher ratio of air to o-xylene is employed.

In all cases, during the commercial heat treatment of the crude PAA after condensation, the chemically combined water in the phthalic acid is driven off to convert the acid into PAA.

In the aforesaid vapor phase, catalytic fluid bed air oxidation of o-xylene, there is usually enough chemically combined water (e.g. phthalic acid) in the PAA from the condensers before any sustained heat treatment thereof, so that it is not necessary to add any water to the crude PAA before subjecting it to the sulfuric acid treatment of the present invention to remove the phthalide. However, if there should be an insufficient amount of phthalic acid in the crude PAA, enough should be added to provide a sulfuric acid-water ratio not exceeding between about 4 to 1 and 6 to 1. In order to ensure an adequate amount of water in the system during the heating step, the initial amount should preferably exceed the minimum amount required. In most cases, the aforesaid initial sulfuric acid-water ratio of between about 4 to 1 and 6 to 1 will provide enough water to be safe.

Although phthalide removal can be effected, in accordance with the present invention, with much larger amounts of chemically combined water, it is undesirable for the phthalic acid to exceed much more than about 10 to 12% of the crude (1 to 1.2% in terms of water) since this will exceed the solubility of phthalic acid in the PAA at the temperatures at which the crude PAA product is removed from the condensers, and it is necessary to drive off the excess water, which adds to the expense of the process. However, so far as phthalide removal is concerned, there is no maximum limit to the amount of chemically combined water, i.e. phthalic acid, which must be observed. The reason for this is that the excess water above that required is vaporized from the system prior to oxidation of the phthalide. However, where excess water is present the temperature at which the phthalide oxidation occurs is increased.

Two mols of $H_2SO_4$ per mol of phthalide in the crude PAA are theoretically required to convert all the phthalide to PAA. However, as a practical matter, substantially more than two mols is ordinarily used, e.g. from 10 to 60% excess. Between three and four mols of sulfuric acid per mol of phthalide have provided excellent results. So far as phthalide removal is concerned, there is no maximum limit to the amount of sulfuric acid which must be observed so long as the ratio of sulfuric acid to water does not exceed the values referred to above. However, an excess amount can have other detrimental effects.

Preferably, the sulfuric acid is added to the molten crude PAA at a temperature substantially below the temperature of reaction between the sulfuric acid and phthalide and below the temperature of water vapor evolution, i.e. below 180° C., e.g. at 150° C., and the mix is slowly heated to 180–200° C. and then from 180–200° C. to 260–270° C. A substantial amount of $SO_2$ evolves usually between 200° C.–220° C. (the reaction between the sulfuric acid and phthalide occurs) and the rate increases until about 225–250° C., depending on the particular crude PAA and rate of heating, whereupon the $SO_2$ evolution decreases sharply. At this point in most cases, most, if not all, of the phthalide has been oxidized. Heating is continued slowly to 260–270° C. at which point substantially all of the phthalide has been reacted. In most cases, there is very little evolution of $SO_2$ after 240–250° C. although in some cases it continues to evolve slowly, particularly where greater amounts of sulfuric acid are used. Thereafter, heating is continued to about 285–290° C. at which temperature the crude PAA is kept for 4 to 16 hours or more. In some cases $SO_2$ still continues to evolve slowly due to oxidation of other impurities or to decomposition reactions where an excessive amount of sulfuric acid is used. As aforesaid, it is important for optimum phthalide removal that the time of heating between the commencement of $SO_2$ evolution (about 180–200° C.) and until about 260–270° C., be slow enough so that most, if not all, of the phthalide is oxidized before reaching 260–270° C. Actually, this heating time should be slow enough so that the unwanted fraction of the phthalide has been converted before the water in the system has been driven off. In most cases, most of the water is driven off at 240–250° F. but this can vary substantially depending upon the amount of sulfuric acid used (sulfuric acid increases substantially the temperature at which the water is driven off), the pressure at which the sulfuric acid treatment is carried out (the greater the pressure, the higher the temperature at which the water is driven off) and other factors. The elapsed time at atmospheric pressure between the commencement of $SO_2$ evolution and reaching 260–270° C. may be as short as 30 minutes to an hour depending on the particular system used. However, such time period can be much longer and there is no maximum time period except for practical considerations. Time periods of three hours and more have been used successfully at atmospheric pressure. Where the sulfuric acid treatment is carried out under positive pressure, the rate of escape of water from the system is reduced substantially so that it takes a longer time for the water to be driven off. Accordingly, the temperature can be raised faster without reducing the water content too greatly before the phthalide has been converted so that the minimum heating time between commencement of phthalide oxidation and reaching the temperature of 260–270° C. may be substantially reduced.

EXAMPLE 1

1000 pounds of 98% sulfuric acid was added in a large tank to 60,000 lbs. of molten crude PAA (160° C.) made by the vapor phase, catalytic, fluid bed air oxidation of o-xylene (air to o-xylene ratio of from 10 to 1 to 11 to 1 and reactor temperature of 680–690° F.), using elemental bromine (0.25 to 1.0% by weight of o-xylene) as a promoter, the PAA being condensed from the product gases in liquid and solid condensers, all as described above. The crude PAA contained 0.98% phthalide and 4.4% phthalic acid. The water equivalent of this phthalic acid was 0.48% by weight. The ratio of sulfuric acid to total water by weight in the system was 3.2 to 1. The contents of the tank were slowly heated at atmospheric pressure. At about 190° C. evolution of $SO_2$ began and was substantially complete at 225° C. in 6 hours. Heating was continued slowly to 260° C., the heating time between 200° C., and 260° C. being 13 hours. The phthalide content of the final product after this treatment was reduced to 0.06%, which is an acceptable amount.

EXAMPLE 2

4200 grams of a molten (160° C.) crude PAA made in the same way as the crude PAA of Example 1 but with slightly different reaction conditions was charged into a 5 liter flask. Forty grams of concentrated $H_2SO_4$ (98%) were added. The crude PAA contained 0.415% by weight phthalide plus between 3 and 4% by weight phthalic acid (between 0.3 and 0.4% water). The ratio of sulfuric acid to water by weight was 2.1–2.6 to one. The mixture was heated slowly at atmospheric pressure. Evolution of $SO_2$ was noted when the temperature reached 210° C. $SO_2$ evolution decreased sharply at 240° C. However, the flask was boiling at that temperature by virtue of the steam being evolved and at 290° C. the PAA was boiling. The heating time between 210° C. and 270° C. was about an hour. The phthalide content of the final product was 0.01%.

EXAMPLE 3

750 grams of pure commercial phthalic anhydride were charged into a 1000 cc. flask. 15.02 grams of phthalide were added and the composite mixture melted by heating to 140° C. 25.11 grams of reagent grade 98% concentrated $H_2SO_4$ were added to the melt. The ratio of sulfuric acid to water by weight was substantially greater than 10 to 1. The mixture was gradually heated at about the same rate as in Example 2 and at atmospheric pressure. No $SO_2$ evolution was noted until the temperature reached 245° C. Heating was continued until the temperature reached the boiling point of the PAA (290° C.). The mixture turned black during this treatment, and the phthalide content was reduced from 2.0% by weight to 1.4%. The black color was attributed to reactions other than oxidation of the phthalide, e.g., sulfonation of the aromatic ring followed by decomposition.

This example proved that without the presence of water, the sulfuric acid treatment is ineffective to remove the phthalide and is, in fact, harmful.

EXAMPLE 4

The treatment of Example 2 was repeated except that 750 grams of the crude PAA and 7 grams of 98% sulfuric acid were heated rapidly to 270° C. over a period of ten minutes. Removal of phthalide was less than 50% and the resulting crude PAA was converted to a black tarry liquid by the treatment.

In summary, the reason why it is important to heat slowly during the time required for the oxidation of phthalide to PAA is that when heating is too rapid, water is removed more rapidly than it is supplied by the prevailing rate of the oxidation reaction so that the water content is reduced to a point at which the desired oxidation is suppressed before the phthalide has been adequately oxidized. Although it has been stated that heating should be slow enough so that the phthalide should be reacted before the temperature reaches 260–270° C., the main object is, commencing at the phthalide reaction temperatures at which $SO_2$ begins to evolve, to complete this oxidation reaction below the temperature at which the water in the system will be driven off, leaving unreacted sulfuric acid and phthalide.

Although nitric acid and other appropriate liquid phase oxidizing agents can be used with or instead of $H_2SO_4$, the latter is highly preferred.

The method of the present invention can be used to remove phthalide from crude PAA containing phthalide regardless of how the crude PAA was prepared.

I claim:

1. A method of removing phthalide from crude phthalic anhydride derived from the catalyst vapor phase oxidation of o-xylene and containing phthalide as an impurity, said method comprising heating $H_2SO_4$ and said crude phthalic anhydride containing phthalic acid, from a temperature at which $SO_2$ commences to be driven off to a higher temperature at which at least most of the phthalide has been reacted with said $H_2SO_4$ to form $SO_2$, water and phthalic anhydride, the initial amount of said $H_2SO_4$ being at least two mols per mol of phthalide in said crude phthalic anhydride, said rate of heating being controlled to react at least most of the phthalide before the amount of water in the system is reduced to a point where the ratio of $H_2SO_4$ to water in the system exceeds about 10 to 1.

2. A method according to claim 1, said rate of heating being controlled to react at least most of the phthalide before the amount of water in the system is reduced to a point where the ratio of $H_2SO_4$ to water in the system exceeds about 6 to 1.

3. A method according to claim 1, said sulfuric acid being added to said crude phthalic anhydride at a temperature below 180° C.

4. A method of removing phthalide from crude phthalic anhydride derived from the catalytic vapor phase oxidation of o-xylene and containing phthalide as an impurity, said method comprising heating $H_2SO_4$ and said crude phthalic anhydride containing phthalic acid, from a temperature at which $SO_2$ commences to be driven off to a temperature of about 260–270° C. over a period of time sufficient to react at least most of said phthalide with sulfuric acid to form phthalic anhydride, $SO_2$ and water before reaching said temperature of 260–270° C., the initial amount of said sulfuric acid being at least two mols per mol of phthalide in said crude phthalic anhydride, the amount of water contained in said crude phthalic anhydride at said temperature at which $SO_2$ commences to be driven off being such that the ratio of sulfuric acid to said water does not exceed about 6 to 1.

5. A method according to claim 4, the rate of heating above said temperature at which $SO_2$ commences to be evolved being slow enough so that at least most of said phthalide is reacted to PAA, water and $SO_2$ before reaching about 240–250° C.

6. A method of removing phthalide from crude phthalic anhydride derived from the catalytic vapor phase oxidation of o-xylene and containing phthalide as an impurity, said method comprising heating $H_2SO_4$ and said crude phthalic anhydride containing phthalic acid from a temperature at which $SO_2$ commences to be evolved to a higher temperature of about 260–270° C. over a period of time sufficient for the rate of evolution of said $SO_2$ to commence to decrease substantially before reaching said temperature of 260–270° C., the initial amount of $H_2SO_4$ being at least about 2 mols per mol of phthalide in said crude phthalic anhydride, the rate of heating being controlled to maintain in said system sufficient water so that the ratio of sulfuric acid to water does not exceed about 10 to 1 before at least most of the phthalide has been reacted with said sulfuric acid.

7. A method according to claim 6, the temperature being kept below about 250° C. until the rate of evolution of $SO_2$ substantially decreases.

8. A method of removing phthalide from crude phthalic anhydride derived from the catalytic vapor phase oxidation of o-xylene and containing phthalide as an impurity, said method comprising increasing the temperature of said crude phthalic anhydride, containing sulfuric acid and water in the form of phthalic acid, from a temperature of about 180–200° C. to a temperature of about 260–270° C. at a rate at which at least most of said phthalide is reacted with said sulfuric acid to form phthalic anhydride, sulfur dioxide and water before said temperature of 260–270° C. is reached, said sulfur dioxide and water being removed as vapors, the initial amount of said sulfuric acid in said crude phthalic anhydride being equal to at least about two mols per mol of phthalide, the initial ratio of sulfuric acid to water not exceeding about 6 to 1.

9. A method according to claim 8, the rate of said heating being slow enough for at least most of said phthalide to be reacted to PAA before reaching 250° C.

10. A method of removing phthalide from crude phthalic anhydride derived from the catalytic vapor phase oxidation of o-xylene and containing phthalide as an impurity, said method comprising heating $H_2SO_4$ and said crude phthalic anhydride, containing phthalic acid, under time and temperature conditions controlled to retain a sufficient amount of water in the system to promote the selective reaction of $H_2SO_4$ with phthalide to form phthalic anhydride, $SO_2$ and water at least until most of said phthalide is so reacted.

11. A method of removing phthalide from crude phthalic anhydride derived from the catalytic vapor phase oxidation of o-xylene and containing phthalide as an impurity, said method comprising heating $H_2SO_4$ and said crude phthalic anhydride containing phthalic acid under time and temperature conditions controlled to retain in the system an amount of water to provide an $H_2SO_4$/water ratio not substantially exceeding 10 to 1 at least until most of the phthalide has reacted with sulfuric acid to form phthalic anhydride, water and $SO_2$.

References Cited

UNITED STATES PATENTS

| | | | |
|---|---|---|---|
| 2,511,861 | 6/1950 | Marotta | 260—346.7 |
| 3,201,423 | 8/1965 | Landau | 260—346.4 |

NICHOLAS S. RIZZO, *Primary Examiner.*

B. I. DENTZ, *Assistant Examiner.*